(12) United States Patent
Lea

(10) Patent No.: US 12,197,905 B2
(45) Date of Patent: Jan. 14, 2025

(54) OVER-THE-AIR (OTA) PLATFORM FOR TR-069 DEVICES TO MANAGE VENDOR-SPECIFIC CONFIGURATION AND FIRMWARE

(71) Applicant: Rakuten Mobile, Inc., Tokyo (JP)

(72) Inventor: Richard Lea, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/042,457

(22) PCT Filed: Nov. 29, 2022

(86) PCT No.: PCT/US2022/051280
§ 371 (c)(1),
(2) Date: Feb. 22, 2023

(87) PCT Pub. No.: WO2024/118059
PCT Pub. Date: Jun. 6, 2024

(65) Prior Publication Data
US 2024/0272891 A1    Aug. 15, 2024

(51) Int. Cl.
*G06F 16/23*    (2019.01)
*G06F 8/65*    (2018.01)
(Continued)

(52) U.S. Cl.
CPC ............. *G06F 8/65* (2013.01); *G06F 21/57* (2013.01); *H04L 41/082* (2013.01);
(Continued)

(58) Field of Classification Search
CPC .. H04W 8/22; H04W 12/069; H04L 63/0442; H04L 67/01; H04L 41/082; G06F 8/65; G06F 21/57
See application file for complete search history.

(56) References Cited

U.S. PATENT DOCUMENTS

2012/0276872 A1* 11/2012 Knauth ............... H04W 12/069
                                                            455/414.1
2016/0226847 A1*  8/2016 Bone .................... H04L 63/0442
(Continued)

OTHER PUBLICATIONS

SIP Gateway-SBC-MSBR Release Notes v.6.8, Aug. 2019, 267 pgs <Gateway_SBC_MSBR Release Notes v6.8.pdf>.*

*Primary Examiner* — Tuan A Vu
(74) *Attorney, Agent, or Firm* — HAUPTMAN HAM, LLP

(57) ABSTRACT

An Over-The-Air (OTA) Platform for TR-069 devices to manage vendor-specific configuration and firmware. A server establishes a TR-069 session with a client device, receives a first request from the client device to download a vendor configuration file, and sends a first target file name of the vendor configuration file to the client device. The server receives a first notification that the vendor configuration file has been downloaded by the client device, receives a second request from the client device to download a firmware image identified by the vendor configuration file, sends a second target file name identifying the firmware image, and receives a second notification from the client device that the firmware image was downloaded and was successfully applied by the client device. The server sends a third notification to the client device acknowledging that the firmware image was successfully applied by the client device.

20 Claims, 15 Drawing Sheets

(51) Int. Cl.
    *G06F 21/57*          (2013.01)
    *H04L 41/082*       (2022.01)
    *H04L 9/40*           (2022.01)
    *H04L 67/01*         (2022.01)
    *H04W 8/22*          (2009.01)
    *H04W 12/069*      (2021.01)

(52) U.S. Cl.
    CPC .......... *H04L 63/0442* (2013.01); *H04L 67/01* (2022.05); *H04W 8/22* (2013.01); *H04W 12/069* (2021.01)

(56) References Cited

U.S. PATENT DOCUMENTS

2016/0234686 A1\*   8/2016  Bone ........................ H04L 67/01
2019/0141655 A1\*   5/2019  Stricklen ................. H04W 8/22

\* cited by examiner

| Parameter | Description |
|---|---|
| Device.DeviceInfo.DeviceCategory (Optional.) | Comma-Separated List of Strings. Each List item is a Device Category (e.g. "Router", "Recorder" and "Tracker"). |
| Device.DeviceInfo.ProductClass (Required.) | Identifier of the Class of Product for which the Serial Number Applies. The Product Class Identifier is Used in Inform Calls from CPE, Including Across Firmware Updates. Any Change Indicates that the Device is a New Device and a BOOTSTRAP Inform is to be Performed. BOOTSTRAP Inform is Sent by CPE to ACS to Inform the ACS of the Identify, and Communication Information for the ACS to Communicate with the CPE. |
| Device.DeviceInfo.Manufacturer (Required.) | The Manufacturer of the CPE. This Parameter is Used in Inform Calls from the CPE to Share Manufacturer Information with the ACS. |
| Device.DeviceInfo.ManufacturerOUI (Required.) | Organizationally Unique Identifier of the Device Manufaturer. Represented as a Six Hexademical-Digit Value Using all Upper-Case Letters and Including any Leading Zeros. The OUI Value is Used in Inform Calls and Remains Fixed Over the Lifetime of the Device, Including Across Firmware Updates. Any Change Indicates that the Device is a New Device and a BOOTSTRAP Inform is to be Performed. |
| Device.DeviceInfo.SerialNumber (Required.) | Identifier of the Particular Device that is Unique for the Indicated Class of Product and Manufacturer. this Value would be Used in Each Inform Call from CPE. This Value MUST Remain Fixed Over the Lifetime of the Device, Including Across Firmware Updates. Any Change would Indicate that it is a New Device and would therefore Require a BOOTSTRAP Inform. |
| Device.DeviceInfo.SoftwareVersion (Optional.) | A String Identifying the Version of the Overall CPE Firmware.International Mobile Equipment Identity (IMEI) Number, Represented as a 15 Digit String (digits 0-9). |

FIG. 3A

| A | B | C |
|---|---|---|
| Device.Cellular.Interface.{i}.IMEI (Required.) — 324, 326 | | Specifies whether or Not this Particular Firmware Image is being Used by the Device. A Device Attempts to Boot this Particular Firmware Image in Response to the Value being Set to True. The Value is Set to True in Response to a New Firmware Image being Installed. In Response to the Firmware Image being Active or being Referenced by the Bootfirmwareimage Parameter, the Value is Not to be Set to False. — 364 |
| Device.Cellular.Interface.{i}.USIM.IMSI (Optional.) | | International Mobile Subscriber Identity Represented as a String with Either 14 or 15 Digits. — 328, 366 |
| Device.Cellular.Interface.{i}.USIM.ICCID (Optional.) | | Integrated Circuit Card Identifier Represented as a String of up to 20 Digits. — 368 |
| Device.Cellular.Interface.{i}.USIM.MSISDN (Optional.) — 330 | | Mobile Subscriber Integrated Service Digital Network Number. — 370 |
| Device.DeviceInfo.FirmwareImage.{i}.Alias (Optional.) — 332 | | A Non-Volatile Unique Key Used to Reference this Instance of the Firmware Image. Alias Provides a Mechanism for a Controller to Label this Instance for Future reference. The Value MUST NOT be Empty and the Value MUST Start with a Letter. In Response to the Value of Alias Not being Assigned by the Controller at Creation Time, an Agent Assigns a Value with an "CPE-" Prefix. The Value of Alias does not Change Once the Value has been Assigned. — 372 |

FIG. 3A
(Continued)

| Parameter (Continued) | Description (Continued) |
|---|---|
| Device.DeviceInfo.Firmware.Image.{i}.Name (Optional.) — 335 | Firmware Image Name. This Value Should be Descriptive Text of the Image or Filename. — 374 |
| Device.DeviceInfo.Firmware.Image.{i}.Version(Required.) — 336 | A String Identifying the Version of the Firmware Image. In response to the Firmware Image Version being Active (i.e., the Device has Booted this Firmware Image), the Value of the DeviceInfo.SoftwareVersion Parameter is to be the Same as the Value Contained in this Parameter. — 375 |
| Device.DeviceInfo.Firmware.Image.{i}.Available (Required.) — 338 | Specifies whether or Not this Particular Firmware Image is being Used by the Device. A Device Attempts to Boot this Particular Firmware Image in Response to the Value being Set to True. The Value is Set to True in Response to a New Firmware Image being Installed. In Response to the Firmware Image being Active or being Referenced by the BootFirmwareImage Parameter, the Value is Not to be Set to False. — 376 |
| Device.DeviceInfo.Firmware.Image.{i}.Status (Required.) | Defines the Following Status of a Firmware Image that can be Determined by an Agent. the Agent is Implemented in the Device and Manages Firmware Image Processing, Validation and Installation Towards Final Reboot. — 378<br>• No Image Indicates that the Firmware Image Instance is Empty. No Image is Used for an Agent that Supports Multiple Firmware Images, but has an Image Installed. — 379<br>• Downloading Indicates that the Firmware Image Instance is being Downloaded. — 380<br>• Validating Indicates that the Firmware Image Instance has been Downloaded, and is in the Process of being Validated. — 381<br>• Available Indicates that the Firmware Image Instance has been Downloaded, Validated, and Installed, and is Ready to be Activated. — 382 |

OTA Vendor-Specific Configuration and Firmware Update Protocol

610
OTA Vendor-Specific Configuration and Firmware Update Protocol First Step: Firmware Update Initiation 620
OTA Vendor-Specific Configuration and Firmware Update Protocol Second Step: Device Information Exchange 630
OTA Vendor-Specific Configuration and Firmware Update Protocol Third Step: Firmware Download 640
OTA Vendor-Specific Configuration and Firmware Update Protocol Fourth Step: Firmware Installation 650
OTA Vendor-Specific Configuration and Firmware Update Protocol Fifth Step: Device Reboot

FIG. 6

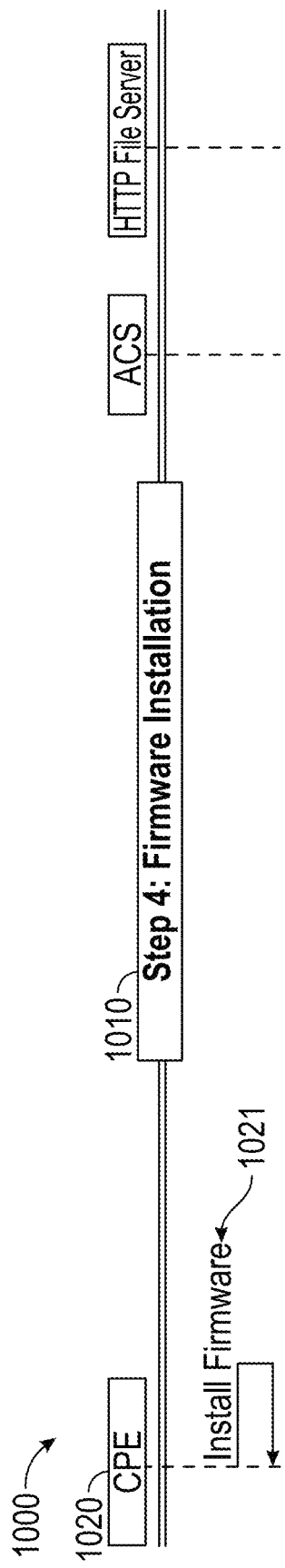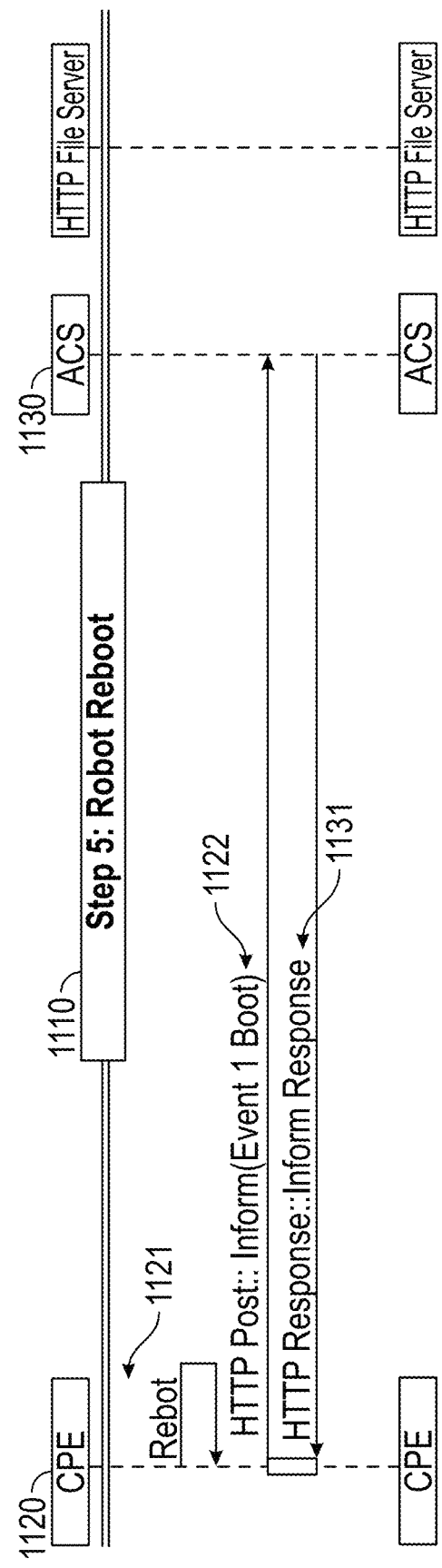

OVER-THE-AIR (OTA) PLATFORM FOR TR-069 DEVICES TO MANAGE VENDOR-SPECIFIC CONFIGURATION AND FIRMWARE

RELATED APPLICATIONS

The present application is the National Phase of International Application No. PCT/US2022/051280, filed Nov. 29, 2022.

TECHNICAL FIELD

This description relates to an Over-The-Air (OTA) Platform for TR-069 devices to manage vendor-specific configuration and firmware.

BACKGROUND

Device re-programming, such as upgrading firmware, has traditionally been performed manually. A consumer was responsible for updating mobile device firmware via a device-specific service facility or a computer download. These inconvenient methods often resulted in inconsistent firmware upgrades and other issues. For operators, manual re-programming of devices is time-consuming and cost-ineffective, and in some instances is cost-prohibitive or impossible. This resulted in the passage of months or years with upgrades being made to devices, and caused such devices to become obsolete and more vulnerable to malicious actors.

Over-The-Air (OTA) is a Mobile Software Management (MSM) technology in which a mobile device is wirelessly configured and upgraded, without the need of physical access to a device. OTA-capable phones download upgrades directly from the service provider. The ability to refresh the operating system of mobile devices keeps mobile devices secure, to add new functionalities, and to address errors, flaws, or faults in mobile device software.

Numerous protocols support OTA. For example, Open Mobile Alliance (OMA) Device Management (DM) is a protocol for management of mobile devices. OMA DM includes a number of specifications including protocol, architecture, underlying network binding etc. In the most common scenario, by implementing OMA DM specifications, the DM Server is able to manage remote management of mobile devices that have a DM Client. For example, at the application layer, OMA DM implements the Firmware Update Management Object (FUMO) and the DM Client. The DM Server performs remote management on devices including provisioning, performing diagnostics, configuring mobile devices, upgrading firmware, and removing, installing, and activating software components. However, OMA DM is designed for use with mobile phones or devices similar to mobile phones.

The Customer Premises Equipment (CPE) Wide Area Network (WAN) Management Protocol (CWMP), published by The Broadband Forum as TR-069, specifies a standard for a communication mechanism for the remote management of end-user devices. The standard defines a protocol for the secure automated configuration of a TR-069-capable device and incorporates other management functions into a common framework. The TR-069 protocol simplifies device management by specifying the use of an Auto Configuration Server (ACS) to perform remote, centralized management of CPEs. However, TR-069 does not provide an application layer for managing Over-The-Air (OTA) firmware upgrades of mobile devices using the OMA DM protocol.

Previously, end device manufactures (e.g., smartphone) and/or carriers manage and control firmware upgrades themselves. Device manufacturers and/or carriers designed their own data-package used for device upgrade and maintained their own servers for managing configuration and firmware upgrades. Firmware Over-The-Air (OTA) and Generic OTA service are also separated as two different network services. Accordingly, different devices depend mostly on vendor's OTA servers. Different vendors' devices are hard to manage in one ACS (TR-069 server), especially in response to vendor-specific parameters being used to configure devices, including, but not limited to, mobile phones. Presently, there is not a platform that provides open source management of vendor-specific configuration and firmware upgrades from different vendors.

SUMMARY

In at least embodiment, a method of providing Over-The-Air (OTA) management of vendor-specific configuration and firmware for TR-069 devices includes establishing, by a server, a TR-069 session with a client device upon receiving a first request from the client device, receiving, by the server, a second request from the client device to download a vendor configuration file, sending, by the server, a first target file name identifying the vendor configuration file at an HTTP file server, receiving, by the server, a first notification that the vendor configuration file has been downloaded by the client device from the HTTP file server, receiving, by the server, a third request from the client device to download a firmware image identified by the vendor configuration file, sending, by the server, a second target file name identifying the firmware image at the HTTP file server, receiving, by the server, a second notification from the client device that the firmware image was downloaded from the HTTP file server and that the firmware image was successfully applied by the client device, and sending, by the server, a third notification to the client device acknowledging that the firmware image was successfully applied by the client device.

In at least embodiment, a platform for providing Over-The-Air (OTA) management of vendor-specific configuration and firmware for TR-069 devices includes a memory storing computer-readable instructions, and a processor configured to execute the computer-readable instructions to establish a TR-069 session with a client device upon receiving a first request from the client device, receive a second request from the client device to download a vendor configuration file, send a first target file name identifying the vendor configuration file at an HTTP file server, receive a first notification that the vendor configuration file has been downloaded by the client device from the HTTP file server, receive a third request from the client device to download a firmware image identified by the vendor configuration file, send a second target file name identifying the firmware image at the HTTP file server, receive a second notification from the client device that the firmware image was downloaded from the HTTP file server and that the firmware image was successfully applied by the client device, send a third notification to the client device acknowledging that the firmware image was successfully applied by the client device.

In at least embodiment, a non-transitory computer-readable media having computer-readable instructions stored thereon, which when executed by a processor causes the processor to perform operations including establishing, by a server, a TR-069 session with a client device upon receiving a first request from the client device, receiving, by the server, a second request from the client device to download a vendor configuration file, sending, by the server, a first target file name identifying the vendor configuration file at an HTTP file server, receiving, by the server, a first notification that the vendor configuration file has been downloaded by the client device from the HTTP file server, receiving, by the server, a third request from the client device to download a firmware image identified by the vendor configuration file, sending, by the server, a second target file name identifying the firmware image at the HTTP file server, receiving, by the server, a second notification from the client device that the firmware image was downloaded from the HTTP file server and that the firmware image was successfully applied by the client device, and sending, by the server, a third notification to the client device acknowledging that the firmware image was successfully applied by the client device.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIGS. 3A-B show a data model according to at least one embodiment.

FIG. 6 illustrates an overview of the OTA Vendor-Specific Configuration and Firmware Update Protocol according to at least one embodiment.

FIG. 10 illustrates the firmware installation method according to at least one embodiment.

FIG. 11 illustrates the device reboot method according to at least one embodiment.

DETAILED DESCRIPTION

Figure 1:
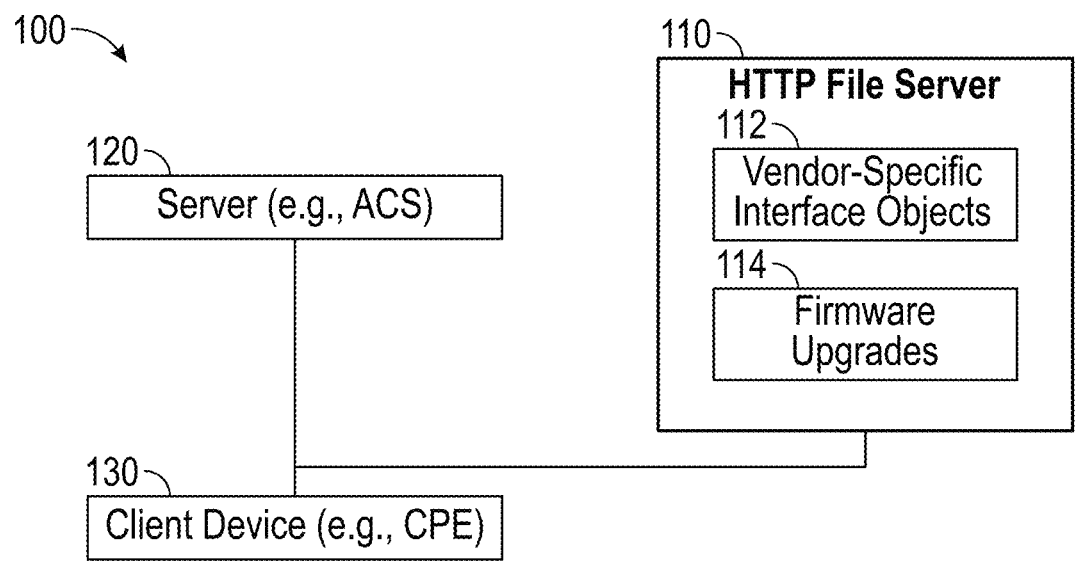
FIG. 1 illustrates a system for providing Over-The-Air (OTA) Platform for TR-069 devices to manage vendor-specific configuration and firmware according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and "at least one of A, B, or C" includes A, B, C, A and B, A and C, B and C, or A and B and C.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming data-stream or signaling-stream. from UE.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

At least one embodiment provides an Over-The-Air (OTA) Platform for TR-069 devices to manage vendor-specific configuration and firmware. The platform is configured to establish a TR-069 session with a client device upon receiving a first request from the client device, receive a second request from the client device to download a vendor configuration file, send a first target file name identifying the vendor configuration file at an HTTP file server, receive a first notification that the vendor configuration file has been downloaded by the client device from the HTTP file server, receive a third request from the client device to download a firmware image identified by the vendor configuration file, send a second target file name identifying the firmware image at the HTTP file server, receive a second notification from the client device that the firmware image was downloaded from the HTTP file server and that the firmware image was successfully applied by the client device, send a third notification to the client device acknowledging that the firmware image was successfully applied by the client device.

Advantages include simplification of Over-The-Air (OTA) server development. Because configurations are encapsulated into vendor's configuration files, devices do not rely on individual servers of network operators and providers. Vendors are able to maintain confidential configuration files while still using the OTA service platform of the carrier.

FIG. 1 illustrates a system 100 for providing OTA Platform for TR-069 devices to manage vendor-specific configuration and firmware according to at least one embodiment.

In FIG. 1, Hypertext Transfer Protocol (HTTP) file server 110 is used to store Vendor-Specific Interface Objects 112 and Firmware Upgrades 114. An Auto Configuration Server (ACS) 120 resides in the network and manages devices in or at the subscriber premises. ACS 120 is responsible for auto-configuration of the Customer Premises Equipment (CPE) for advanced services based on files stored in HTTP file server 110.

CPE 130 is a TR-069-enabled device, such as Mobile Phones Residential Gateways, LAN (Local Area Network)-side End Devices, and other Network Infrastructure Devices. TR-069 specifies the communication between CPE and ACS 120. The ACS 120 acts as a remote management server for TR-069 enabled CPE 130. ACS 120 enables automated remote provisioning and management tasks for TR-069 CPE devices, such as provisioning vendor-specific interface objects (e.g., vendor-specific configuration files) and firmware upgrades obtained by ACS 120 from HTTP file server 110. ACS 120 provisions vendor-specific interface objects and firmware upgrades to CPE 130.

Figure 2:
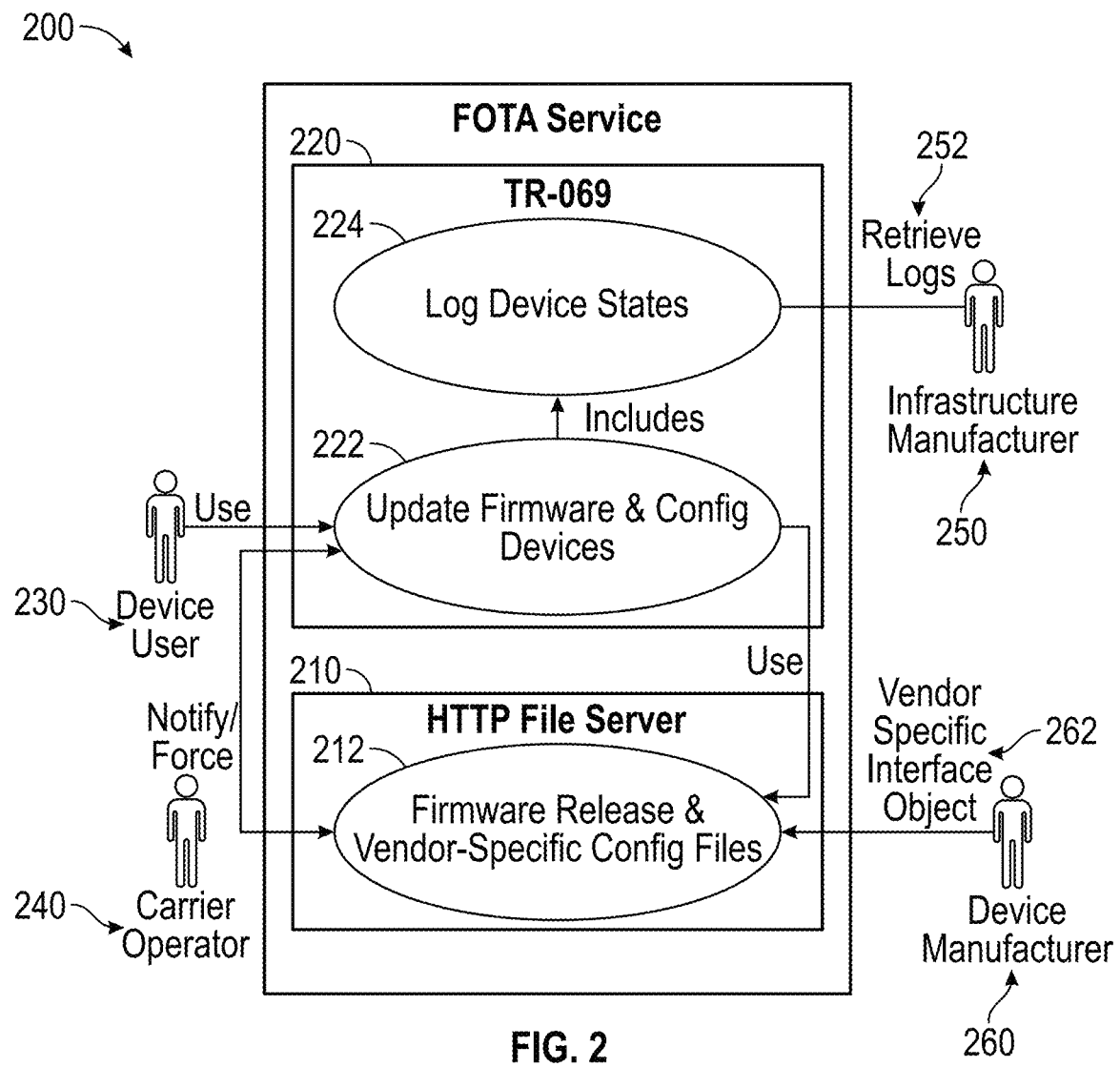
FIG. 2 illustrates an Over-The-Air (OTA) Platform for TR-069 devices to manage vendor-specific configuration and firmware according to at least one embodiment.

FIG. 2 illustrates an Over-The-Air (OTA) Platform 200 for TR-069 devices to manage vendor-specific configuration and firmware according to at least one embodiment.

The OTA Services Platform 200 is able to be used under real business scenarios by manufacturers, operators and users. In FIG. 2, OTA Services Platform 200 includes an HTTP File Server 210 and TR-069 OTA Interface 220. TR-069 OTA Interface 220 is accessed by a Device User 230 to initiate implementation of Update Firmware and Configuration of Device 222 or by Carrier Operator 240 to notify the device of Device User 230 to initiate implementation of Firmware Release and Vendor-Specific Config Files 212.

Update Firmware and Configuration of Device 222 or to force the device of Device User 230 to Update Firmware and Configuration of Device 222. The Carrier Operator 240 is able to provide a Firmware Release 212 to HTTP File Server 210. Infrastructure Manufacturers 250 are able to retrieve logs 252 from Log Device States 224. Device Manufacturers 260 are able to provide Vendor-Specific Interface Objects 262 to HTTP File Server 210 where Vendor-Specific Interface Objects 262 are not processed by OTA Services Platform 200 and HTTP File Server 210 simply persists the Vendor-Specific Interface Objects 262 that are uploaded form the vendor so that Firmware Release and Vendor-Specific Configuration Files 212 are passed to the devices of Device User 230.

The OTA Services Platform 200 provides an interoperable configuration and firmware update solution for mobile devices based on Update Firmware and Configuration of Device 222. In at least one embodiment, OTA Services Platform 200 provides an interface between client and server to support the firmware update and implementation of vendor-specific configuration files to mobile devices based on The Services Platform 200 supports the download of firmware update package(s) and Vendor-Specific Interface Objects 262, the subsequent installation of the firm update package(s), and configuration using Vendor-Specific Interface Object 262.

In at least one embodiment, Vendor-Specific Interface Objects 262 conform to at least one of TR-181 or TR-106. TR-181 is a device data model that encompasses a variety of CPE configuration and monitoring parameters. TR-181 enables commands that are run on devices and returns valuable diagnostic data. TR-181 defines what is managed, monitored, and manipulated by TR-069. TR-106 specifies data model guidelines to be followed by TR-069-enabled devices, and include a structure for the data hierarchy, a specification for versioning of data models, and models for defining profiles. TR-106 also defines an XML Schema that allows a device to describe its supported TR-069 data models.

Services platform 220 reports success or error results and associated status information that are maintained as Log Device States 224. Carrier operators, service providers, infrastructure manufactures, Device Manufacturers 260 (device vendors), and software vendors (mostly same with device manufacturers) use the services platform 200 to develop and deploy interoperable configuration and firmware update solutions.

Device Manufacturers 260 are provided with a different level of arbitrariness for implementing upgrade data packages. Firmware Releases in Vendor-Specific Configuration Files 212 provides a more abstract data model to Device Manufacturers 260 that provides more options for upgrade data package designs. Device manufacturers can define any fields in the Vendor-Specific Interface Objects 262 with any encoding methods chosen by the vendors. Only the vendor's devices process and decode the Firmware Release and Vendor-Specific Configuration Files 212. Device Manufacturers 260 often do not want to disclose the details of parameters to the Carrier Operator 240. OTA Services Platform 200 allows Device Manufacturers 260 to provide upgrade data package designs to be provided through Vendor-Specific Interface Objects 262 to the OTA Services Platform 200 for configuring and updating user devices without revealing the details of specified parameters.

In FIG. 2, the OTA services platform 200 uses a data model designed for providing OTA services based on TR-069 parameters. Device manufacturers provide the details of the specified parameters used by the data model for providing FOTA services, as described in detail with reference to FIGS. 3A-B.

For example, parameters used by the OTA services platform 200 for firmware updates and configuration based on vendor configuration files include parameters associated with device information, device cellular interface, device information regarding a firmware image, and VendorConfigFile.Version. This data is logged in Log Device States 224.

As an example, Datetime provides the date and time of the given record line. International Mobile Equipment Identity (IMEI) number is represented as a 15 digit string (digits 0-9). ProductClass is the identifier of the class of product for which the serial number applies, as defined in TR-181. This value is used in an Inform call from CPE, as defined in TR-069 DeviceIdStruct. The value of ProductClass remains fixed over the lifetime of the device, including across firmware updates. Any change indicates that it is a new device and a BOOTSTRAP Inform is to be performed.

SerialNumber is the identifier of the particular device that is unique for the indicated class of product and manufacturer. The value of SerialNumber is used in an Inform call from CPE. The value of SerialNumber remains fixed over the lifetime of the device, including across firmware updates. Any change indicate that the device is a new device and a BOOTSTRAP Inform is to be performed.

Organizationally Unique Identifier (OUI) of the device manufacturer is represented as a six hexadecimal-digit value using upper-case letters and including any leading zeros. As defined in TR-069, the OUI value is used in an Inform call and remains fixed over the lifetime of the device, including across firmware updates. Any change indicates that the device is a new device and a BOOTSTRAP Inform is to be performed.

Software Version is a string identifying the version of the overall CPE firmware as defined in TR-181. FirmwareImage.Version is the target firmware version to update.

FirmwareImage.Status identifies the target firmware version to update, as defined by Device.DeviceInfo.FirmwareImage.{i}.Status. Following TR-181 and the parameter Device.DeviceInfo.FirmwareImage.{i}.Status, the target FirmwareImage to upgrade starts from the state of "NoImage" and terminates at one of the following status: Available, DownloadFailed, ValidationFailed, InstallationFailed, ActivationFailed. Available indicates that the firmware image instance has been downloaded, validated, and installed, and is ready to be activated. DownloadFailed indicates that downloading the firmware image instance has been attempted, but the download failed while retrieving the firmware image instance from the source URL. ValidationFailed indicates that validation of firmware image instance has been attempted, but the process failed during validation. InstallationFailed indicates that an attempt has been made downloaded and validated, but that the installation of the firmware image failed. ActivationFailed indicates that activation of the firmware image has failed.

VendorConfigFile.Version identifies the configuration file version currently used in the CPE. Device.DeviceInfo.VendorConfigFile.{i}.Version is used to identify the configuration file version currently used in the CPE. The CPE obtains the version of the configuration file from the Vendor Configuration File and the value of this parameter is set to the obtained value. In response to the CPE not being able to obtain the version of the configuration file from the file, then the value of this Parameter is an empty string. Device.DeviceInfo.VendorConfigFile.{i}.Date identifies the date and time that the content of the current version of the vendor configuration file was first applied by the CPE.

Figure 3B:
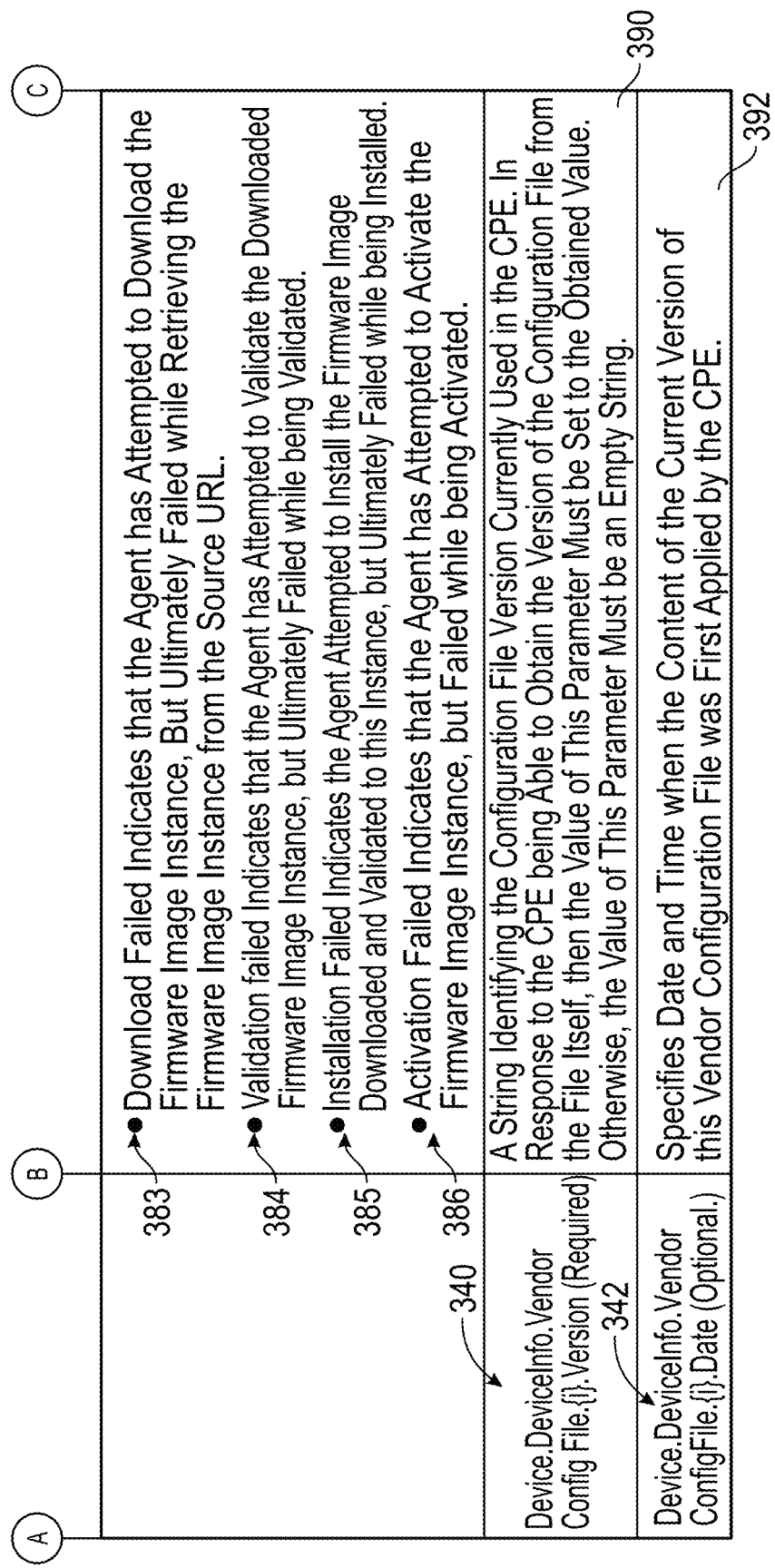

FIGS. 3A-B show a data model according to at least one embodiment.

The firmware update data model parameters are based on TR-181 Device:2 Data Model definitions as shown in Table 1. An instance of this Firmware Update Model follows the lifecycle of Device:2 Data Model itself, and follows the state diagram.

TABLE 1

Firmware Update Data Model Overview

| Name | Type | Description |
| --- | --- | --- |
| Device.DeviceInfo | object | ProductClass, Manufacturer, OUI, SerialNumber |
| Device.Cellular.Interface.{i}. | object | A cellular modem including IMEI, and USIM |
| Device.DeviceInfo.FirmwareImage.{i}. | object | Top-level object for mapping firmware images, helping ACS capture the device firmware, push firmware update decision. |
| Device.DeviceInfo.VendorConfigFile.{i}. | object | Vendor Configuration Files that CPE downloads from ACS. |

There may be one or more Firmware Image Interface Objects in one TR-069 session. Firmware images are mapped in the top-level object, Device.DeviceInfo.FirmwareImage.{i}. The following are the children Interface Objects of the Firmware Update Data Model based on TR-181.

The parameter Device.DeviceInfo.DeviceCategory (Optional) 312 has a description 352 of being a comma-separated list of strings. Each list item is a device category (e.g. "Router", "Recorder" and "Tracker").

The parameter Device.DeviceInfo.ProductClass 314 has a description 355 of being an identifier of the class of product for which the serial number applies. The product class identifier is used in Inform calls from CPE, and remains fixed over the lifetime of the device, including across firmware updates. Any change indicates that the device is a new device and a BOOTSTRAP Inform is to be performed. BOOTSTRAP inform is sent by CPE to ACS to inform the ACS of the identify, and communication information for the ACS to communicate with the CPE.

The parameter Device.DeviceInfo.Manufacturer 316 has a description 356 of being an identifier of the manufacturer of the CPE. This parameter is used in Inform calls from the CPE to share manufacturer information with the ACS.

The parameter Device.DeviceInfo.ManufacturerOUI 318 has a description 358 of being an Organizationally Unique Identifier (OUI) of the device manufacturer and is represented as a six hexadecimal-digit value using upper-case letters and including any leading zeros. The OUI value is used in Inform calls and remains fixed over the lifetime of the device, including across firmware updates. Any change indicates that the device is a new device and a BOOTSTRAP Inform is to be performed.

The parameter Device.DeviceInfo.SerialNumber 320 has a description 360 of being an identifier of the particular device that is unique for the indicated class of product and manufacturer. The serial number is used in Inform calls from the CPE. and remains fixed over the lifetime of the device, including across firmware updates. Any change indicates that the device is a new device and a BOOTSTRAP Inform is to be performed.

The parameter Device.DeviceInfo.SoftwareVersion (Optional) 322 has a description 362 of being a string that identifies the version of the overall CPE firmware.

The parameter Device.Cellular.Interface.{i}.IMEI 324 has a description 364 of being the International Mobile Equipment Identity (IMEI) number that is represented as a 15 digit string (digits 0-9).

The parameter: Device.Cellular.Interface.{i}.USIM.IMSI (Optional) 326 has a description 366 of being the Universal Subscriber Identity Module (USIM) International Mobile Subscriber Identity (IMSI) as represented as a string with either 14 or 15 digits.

The parameter Device.Cellular.Interface.{i}.USIM.ICCID (Optional) 328 has a description 368 of being the USIM Integrated Circuit Card Identifier (ICCID) that is represented as a string of up to 20 digits.

The parameter Device.Cellular.Interface.{i}.USIM.MSISDN (Optional) 330 has a description 370 of being the USIM Mobile Subscriber Integrated Service Digital Network (MSISDN) Number.

The parameter Device.DeviceInfo.FirmwareImage.{i}.Alias (Optional) 332 has a description 372 of being a non-volatile unique key used to reference the instance of the firmware image. Alias provides a mechanism for a controller to label this instance of the firmware image for future reference. Alias is not to be empty, and starts with a letter. In response to the value of Alias not being assigned by the controller at creation time, an agent assigns a value with an "CPE-" prefix. The value of Alias does not change once the value has been assigned.

FIG. 3B continues the description of the data model according to at least one embodiment.

The parameter Device.DeviceInfo.FirmwareImage.{i}.Name (Optional) 334 has a description 374 of being the firmware image name. This firmware image name is a descriptive text of the image or filename.

The parameter Device.DeviceInfo.FirmwareImage.{i}.Version 335 has a description 375 of being is a string that identifies the version of the firmware image. In response to the firmware image version being active (i.e., the device has booted this firmware image), the value of the DeviceInfo.SoftwareVersion parameter is to be the same as the value contained in this parameter.

The parameter Device.DeviceInfo.FirmwareImage.{i}.Available 336 has a description 376 of specifying whether or not this particular firmware image is being used by the device. A device attempts to boot this particular firmware image in response to the value being set to true. The value is set to true in response to a new firmware image being installed. In response to the firmware image being active or being referenced by the BootFirmwareImage parameter, the value is not to be set to false.

The parameter Device.DeviceInfo.FirmwareImage.{i}.Status 338 has a description 378 of defining the following status of a firmware image that can be determined by an agent. The agent is implemented in the device and manages firmware image processing, validation and installation towards final reboot. NoImage 379 indicates that the firmware image instance is empty. NoImage is used for an agent that supports multiple firmware images, but has an image installed. Downloading 380 indicates that the firmware image instance is being downloaded. Validating 381 indicates that the firmware image instance has been downloaded, and is in the process of being validated. Available 382 indicates that the firmware image instance has been downloaded, validated, and installed, and is ready to be activated. DownloadFailed 383 indicates that the agent has attempted to download the firmware image instance, but ultimately failed while retrieving the firmware image instance from the source URL. ValidationFailed 384 indicates that the agent has attempted to validate the downloaded firmware image instance, but ultimately failed while being validated. InstallationFailed 385 indicates the agent attempted to install the firmware image downloaded and validated to this instance, but ultimately failed while being installed. ActivationFailed 386 indicates that the agent has attempted to activate the firmware image instance, e but failed while being activated.

The parameter Device.DeviceInfo.VendorConfigFile.{i}.Version 340 has a description 390 of specifying a string that identifies the configuration file version currently used in the CPE. In response to the CPE being able to obtain the version of the configuration file from the file itself, then the value of this Parameter MUST be set to the obtained value. Otherwise, the value of this parameter MUST be an empty string.

Figure 4:
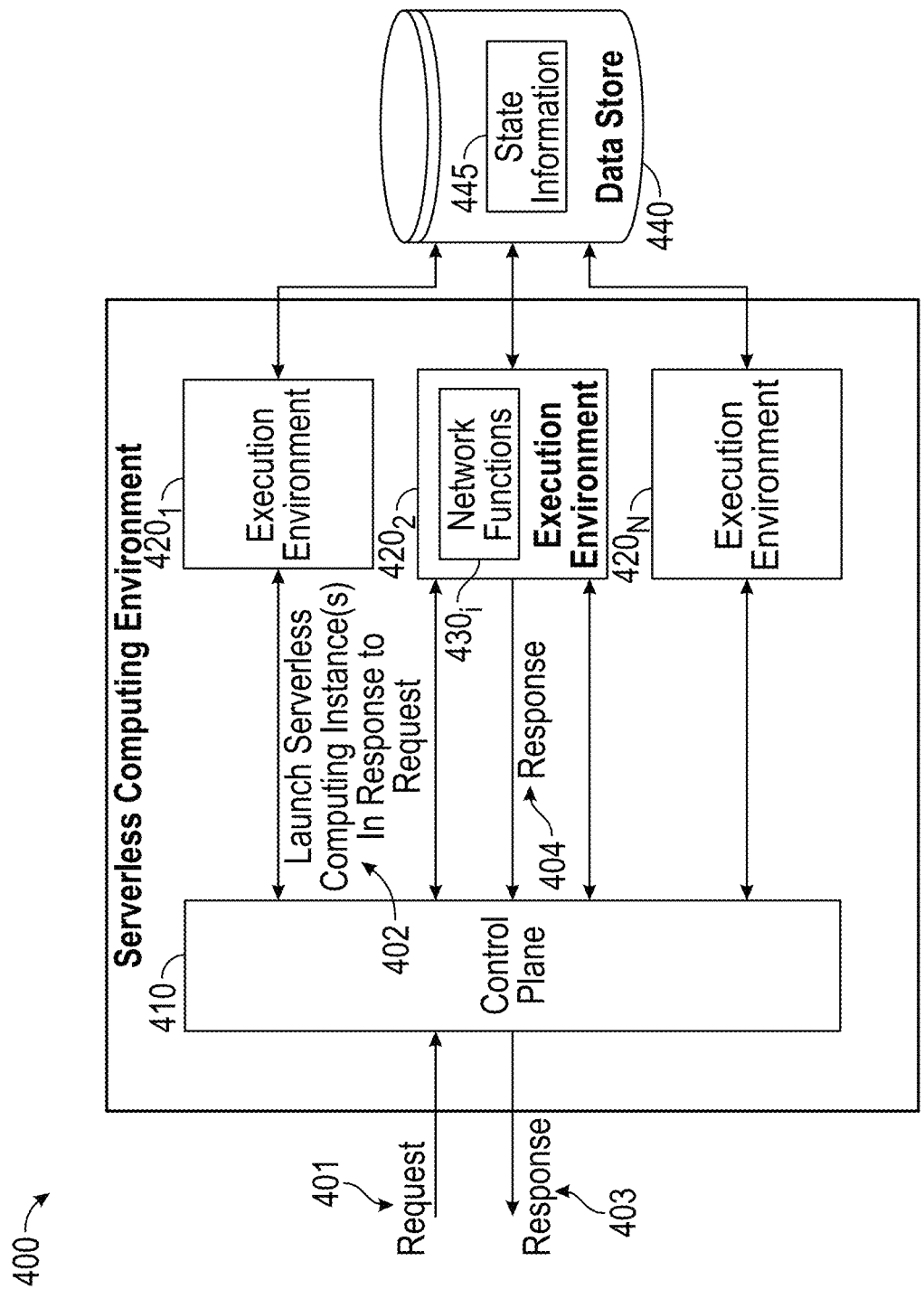
FIG. 4 illustrates a block diagram of a serverless computing environment according to at least one embodiment.

The parameter Device.DeviceInfo.VendorConfigFile.{i}.Date 342 has a description 392 of a date and time when the content of the current version of this vendor configuration file was first applied by the CPE. FIG. 4 illustrates a block diagram of a serverless computing environment 400 according to at least one embodiment.

Serverless computing environment 400 is also sometimes referred to as "Functions-as-a-Service (FaaS)," which provides computing in short-lived, stateless, small chunks with highly flexible scaling. In contrast to (Virtual Machines (VMs) and physical servers, users of serverless computing services do not provision/manage VMs or physical servers, and instead build applications as a set of functions that run in the serverless computing environment. Resource provisioning and scaling are then managed by, e.g., a cloud provider of the serverless computing environment.

Serverless computing environment 400 is used to provide FOTA services according to at least one embodiment. Device manufacturers do not contribute independent development for the Serverless computing environment 400. Network Function $430_{1-n}$ are configured with parameters designed for providing FOTA services as described herein.

Serverless computing environment 400 includes a control plane 410 (also referred to as a "serverless computing platform") in communication with multiple execution environments $420_1, 420_2, 420_N$. Execution environments $420_1$ to $420_N$ are Virtual Machines (VMs), lightweight containers, containers running in VMs, or any other suitable virtual computing instance or physical system in which functions run. As described, serverless computing environment 400 permits users to package their applications as stateless functions that are housed in small short-lived compute units (e.g., containers) and dynamically scale functions based on user-provided events. Control plane 410 receives and filters requests from users. For example, a response is able to be received to trigger a firmware upgrade. In response to receiving the request, control plane 410 launches an appropriate serverless computing instance in one of execution environments $420_1$ to $420_N$. The serverless computing instance is launched in a container that is already running or, if no compatible container is running, a container also is launched that runs the serverless computing instance. Although described herein with respect to launching serverless computing instance(s), those skilled in the art understand that the serverless computing environment 400 re-uses serverless computing instance(s) rather than launching new serverless computing instance(s) in response to the serverless computing instance(s) already running. That is, "launching" as used herein refers to the launch of a new serverless computing instance or re-use of an already running serverless computing instance(s), as appropriate.

In response to receiving a request 401 from a client device, control plane 410 of serverless computing environment 400 launches (or re-uses) serverless computing instance(s) 402 to execute the requested network function(s) (e.g., network function 430$i$) in the appropriate execution environment(s) $420_1$ to $420_N$. TR-069 parameters for implementing the OTA Platform for TR-069 devices to manage vendor-specific configuration and firmware are provided to execution environment(s) $420_1$ to $420_N$.

Although the executing of network functions as serverless computing instances is described herein for ease of understanding, in some embodiments, network functions 430$i$ are decomposed into sub-functions/micro-services that run as serverless computing instances. That is, a serverless computing instance runs a network function or a sub-function/module of network function 430$i$, and "network function" as used herein refers to either a network functions or a network sub-function/module. In response to state information being used for processing of the request by any of the network function(s), then a serverless computing instance first queries data store 440 for the state information 445 and then use such information in processing the request. The launched (or re-used existing) serverless computing instance(s) then processes the request and sends a response 404 to control plane 410. Control plane 410 forwards response 403 to the requesting client device.

Figure 5:
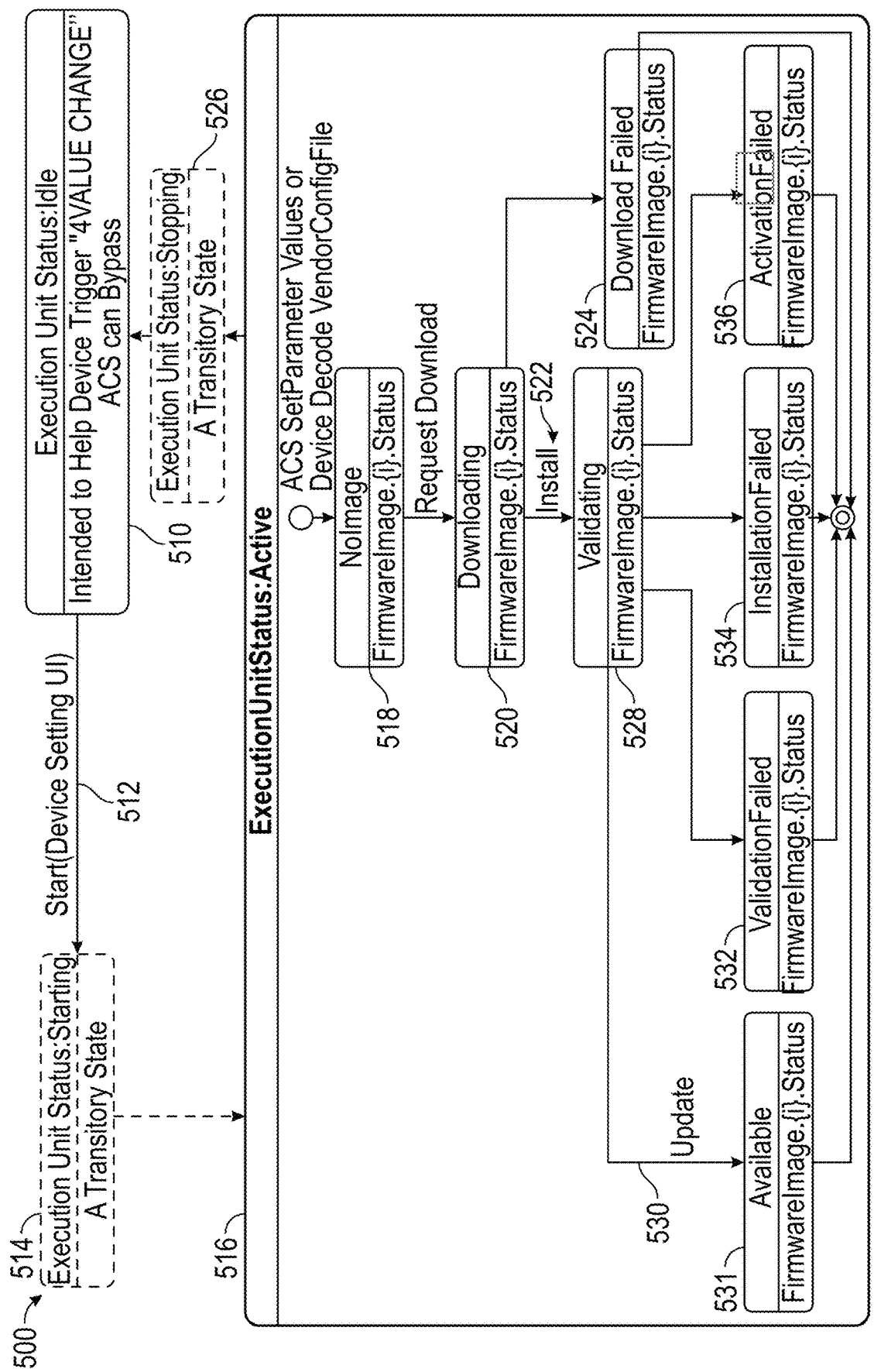
FIG. 5 illustrates the firmware update state diagram according to at least one embodiment.

FIG. 5 illustrates the firmware update state diagram 500 according to at least one embodiment.

While the device is starting a Firmware Update, the device obtains the latest firmware image information from ACS as illustrated above with regard to FIG. 1. TR-069 defines a Customer Premise Equipment (CPE)_Wireless Access Network (WAN) management protocol (CWMP) used between an auto-configuration server (ACS) and CPE. TR-181 defines the device data model for TR-069 devices. The target firmware image appears in the device's Device.DeviceInfo.FirmwareImage.{i} interface objects as described below. Thus, the target firmware image being upgraded starts from the state of "NoImage" and terminate at one of the status of Available, DownloadFailed, ValidationFailed, InstallationFailed, ActivationFailed.

The Execution Unit Status begins in the idle state 510. Idle state 510 is intended to help device trigger "4 VALUE CHANGE." Because the operations on Device Setting UI is not defined in TR-181, interface objects, the device is able to represent the state transitions through an Execution Unit as defined in TR-069. The ACS is able to bypass this value change.

In the Device Setting User Interface (UI), the firmware update is started 512. The Execution Unit Status transitions to the Starting state 514. As shown in FIG. 5, the Starting state 514 is a transitory state. The Execution Unit State moves to Active state 516.

ACS Set Parameter Values and VendorConfigFile objects are provided to No Image state 518. The download is requested 520. In response to the Firmware Image status being success the firmware is installed 522.

In response to the Firmware Image status failing 524, the state diagram returns to the Execution Unit Status: Stopping 526. As shown in FIG. 5, the Execution Unit Status: Stopping 526 state is a transitory state. In installing the firmware update 522, the firmware image is validated 528.

The firmware image upgrade is updated 530 and Available 531. The state diagram then returns to the Execution Unit Status: Stopping 526. Alternatively, the firmware image validation fails 532, the firmware image installation fails 534, or the firmware image activation fails 536. In response to the firmware image validation failing 532, the firmware image installing failing 534, or the firmware image activation failing 536, the state diagram returns to the Execution Unit Status: Stopping 526.

States shown in firmware update state diagram 500 are sent to the ACS. The ACS is able to capture and process all states. The ACS is able to achieve FOTA according to at least one embodiment described herein in response to the Device Setting UI ignoring the status. However, the status change in FirmwareImage cannot be bypassed.

FIG. 6 illustrates an overview of the OTA Vendor-Specific Configuration and Firmware Update Protocol 600 according to at least one embodiment.

In FIG. 6, OTA Vendor-Specific Configuration and Firmware Update Protocol 600 specifies a set of procedures with associated parameters and management objects that are used for OTA updates, including configuring a CPE and for providing firmware upgrades. The procedures of the OTAs Vendor-Specific Configuration and Firmware Update Protocol 600 also enable implementation of the Device Setting UI that allows different triggers for initializing the firmware update and for logging status history of firmware images in the devices.

The OTA Vendor-Specific Configuration and Firmware Update Protocol 600 is based on TR-069 (Customer Premises Equipment (CPE) Wide Area Network (WAN) Management Protocol (CWMP)). Parameters are simple name and value pairs that vendor decides to support in the vendor's devices, e.g., CPEs. A combination of supported parameters is called Data Model (DM).

Parameters that vendors are able to define are based on TR-098 and TR-181. TR-098 specifies the Internet Gateway Device data model for TR-069 (i.e., CPE WAN Management Protocol (CWMP)). TR-181 is a device data model for implementing CPE configuration and monitoring parameters.

A remote procedure call (RPC) is an operation between an ACS and the CPE that is used for bidirectional communication. The bidirectional communication includes methods initiated by an ACS and sent to a CPE, as well as methods initiated by a CPE and sent to an ACS. Some common RPCs (methods) include:

GetParameterValues: The ACS uses this RPC to get the value of one or more parameters of a CPE SetParameterValues: The ACS sets the value of one or more parameters of a CPE GetParameterNames: The ACS uses this RPC to discover the parameters accessible on a CPE Inform: A CPE sends this message to an ACS to initiate a session and to periodically send local information Download: When the ACS manages a CPE downloading a specified file to upgrade firmware and download a configuration file Upload: When the ACS managers a CPE uploading a specified file to a designated location.

AutonomousTransferComplete: informs the ACS of the completion (either successful or unsuccessful) of a file transfer that was not specifically requested by the ACS.

Reboot: An ACS reboots a CPE remotely when the CPE encounters a failure or needs a software upgrade AddObject: This allows the ACS to create instances of objects available on the CPE, for example, port mapping entries. The ACS also creates the associated parameters and sub-objects.

DeleteObject: Enables the ACS to delete existing instances of objects available on the CPE. It also deletes the associated parameters and sub-objects.

In a TR-069 environment, tasks are completed through sessions. The firmware of a CPE is updated using a download RPC with FileType="1 Firmware Upgrade Image" and a URL of a downloadable file from an HTTP File Server. Multiple URLs of files are able to be downloaded to the CPE. According to embodiments described herein, the OTA Vendor-Specific Configuration and Firmware Update Protocol 600 supports a complete configuration overwrite or a configuration alteration. A filename extension of URL for a configuration alteration is ".alter". A configuration overwrite is performed using download RPC FileType="3 Vendor Configuration File" with any URL file name. The downloaded configuration is applied after a reboot of the CPE.

The OTA Vendor-Specific Configuration and Firmware Update Protocol First Step 610 involves the firmware update initiation. A device is able to use a Vendor-Specific Parameter to for "4 VALUE CHANGE" notifications. CPEs produce notifications for subscribed attributes using the TR-069 Inform method, wherein the Inform method has an argument Event that has as one of the EventCodes with the value "4 VALUE CHANGE" indicating that a subscribed parameter's value has changed. The parameter(s) that have changed are included ParameterList argument.

A user device is able to alternatively represent the state transitions through an execution environment as defined in TR-069. The ACS is able to bypass this value change in response to Vendor-Specific Parameters being used. For device-polling updates, TR-069 defines the "2 PERIODIC" event by which clients periodically initialize a TR-069 session for Device Information Exchange in OTA Vendor-Specific Configuration and Firmware Update Protocol Second Step 620. For example, an inform including "2 PERIODIC" event is able to be used to initialize the firmware update session The OTA Vendor-Specific Configuration and Firmware Update Protocol Second Step 620 involves the device information exchange. The minimum set of criteria for providing vendor-specific parameters include Device.Cellular.Interface.{i}.IMEI identifying the International Mobile Equipment Identity (IMEI) number, Device.DeviceInfo.SoftwareVersion, identifying the version of the firmware image of the CPE, and Device.DeviceInfo.VendorConfigFile.{i} identifying the version of the configuration file used by the CPE, and the date and time of application of the vendor configuration file by the CPE. An ACS requests firmware image exchange and receives an HTTP response as describe in detail below.

The OTA Vendor-Specific Configuration and Firmware Update Protocol Third Step 630 involves the firmware download. The OTA Vendor-Specific Configuration and Firmware Update Protocol Fourth Step 640 involves the firmware installation. The OTA Vendor-Specific Configuration and Firmware Update Protocol Fifth Step 650 involves the device reboot to update the firmware used by the device. Steps 610-650 are described in greater detail with respect to FIGS. 7-11.

CPE WAN Management Protocol (CWMP) is a communication protocol used between an ACS and CPE that defines a mechanism for secure auto-configuration of a CPE and other CPE management functions in a common framework. The procedures of OTA Vendor-Specific Configuration and Firmware Update Protocol 600 extend CWMP to allow for an implementation of the procedures for configuring CPEs and upgrading firmware. The procedures of OTA Vendor-Specific Configuration and Firmware Update Protocol 600 are implemented according to a data model that conforms to TR-181 and its behavior to support updating firmware in mobile devices according to TR-069. The procedures of OTA Vendor-Specific Configuration and Firmware Update Protocol 600 leverages CWMP based on TR-069 and Device:2 Data Model based on TR-181. This represents the interface between the CPE device and ACS used to manage the update of the firmware of a mobile device. The content and format of the update package, and the process used to update firmware in the device are implementation specific and are not limited by embodiments described herein.

The procedures of OTA Vendor-Specific Configuration and Firmware Update Protocol 600 supports the use of multiple firmware images of TR-069. A vendor is able to encode a confidential Vendor-Specific Configuration file that is only able to be parsed by that vendor's device. Therefore, even in response to the vendor encoding a Vendor-Specific Configuration file in a different way that is not shared, a device of the vendor is still able to finish OTA including the situation of FOTA via vendor configuration file sharing. Devices are able to support multiple firmware images, wherein multiple firmware images are able to be installed on the CPE at the same time. Installation of multiple firmware images improves the robustness and stability of a device. In response to a device not being able to boot a newly installed firmware image, the device has the ability to attempt to boot from a different firmware image.

Being able to support multiple firmware images offers the service provider the ability to download a firmware image without activating the firmware image. Then, the service provider is able to cause the device to switch to the downloaded, but inactivated firmware image, by sending a call to SetParameterValues and the device rebooting at some later time. This spreads the download portion a firmware upgrade over a longer period of time to minimize the impact of the upgrade on the provider's network. In operation, the device downloads the firmware image and installs the firmware into a non-active firmware image location.

Once a device has multiple firmware images installed and available for activation, an ACS uses the data model to query what images are on the device, which image is active, and configure which image the device is to activate the next time the device reboots. Another benefit of having multiple firmware images on a device is that in response to a device not being able to boot into a target firmware image because of some problem with the image, the device is able to boot one of the other firmware images. The ACS keeps track of the value of "Device.DeviceInfo.SoftwareVersion" parameter so that the device is able to boot the appropriate firmware image.

Figure 7:
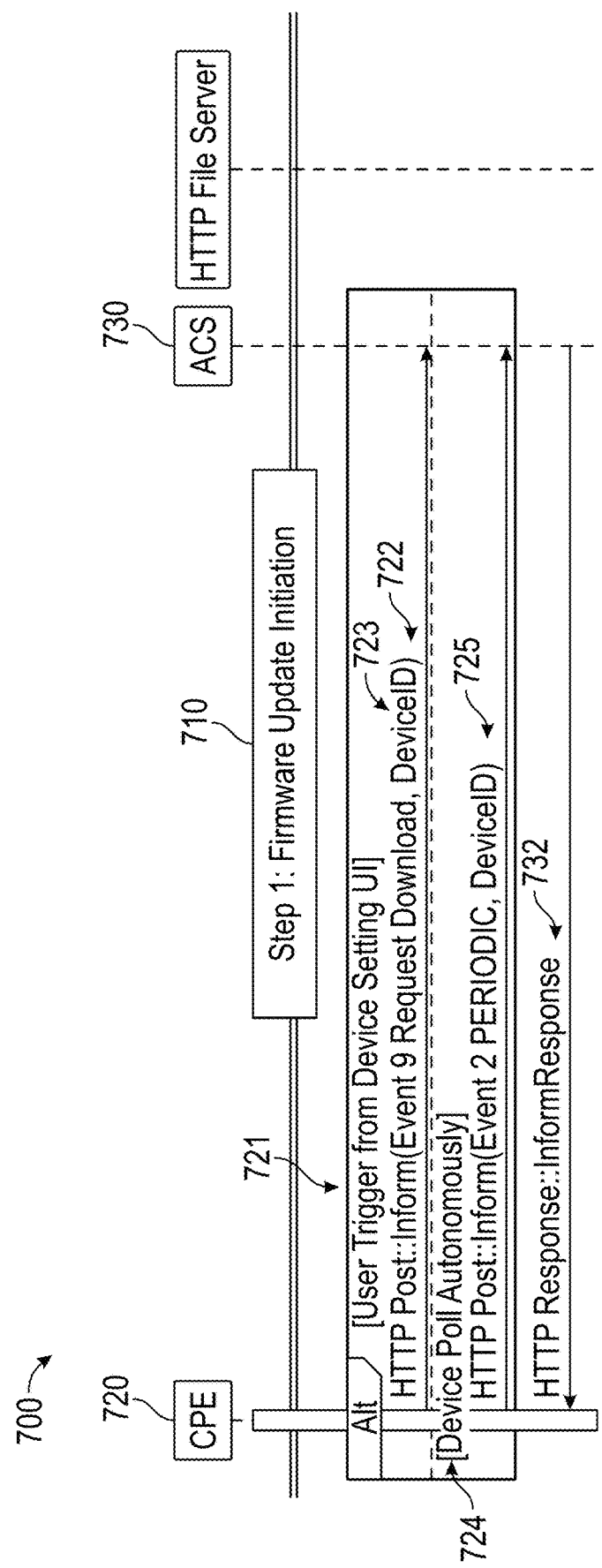
FIG. 7 illustrates the firmware update initiation method according to at least one embodiment.

FIG. 7 illustrates the firmware update initiation method 700 according to at least one embodiment.

In order to begin a firmware update, the CPE 720 opens a data connection to the ACS 730. The firmware update process is able to be initiated through use of a trigger from a device setting UI, by an autonomous device poll, through menu items, and use of service codes on the device. The user-triggered update process launches a TR-069 session. TR-069 session is initiated by a CWMP Endpoint on a CPE based on an event. In FIG. 7, firmware update initiation 710 is triggered through the Device Setting UI 721 by the CPE 720 sending an HTTP post request including a TR-069 inform (event 9 Request Download, Device ID) message encoded as Simple Object Access Protocol (SOAP) 722 to the ACS 730.

HTTP post request including a TR-069 inform message encoded as SOAP 722 is used to establish a session with ACS 730 in which CPE 720 intends to download information from ACS 730. In FIG. 7, HTTP post request including a TR-069 inform message encoded as SOAP 722 includes event 9 Request Download and DeviceID 723 to inform the ACS of the device IMEI of CPE 720

Instead of using a trigger from a device setting UI 721, a session is able to be initiated by an autonomous device poll 724, through menu items, and use of service codes on the device. In response to triggering the firmware update initiation 710 through autonomous device poll 724, CPE 720 sends to the ACS 730 an HTTP post request including a TR-069 inform message encoded as SOAP 725, in response to expiration of the periodic inform interval that has been set for the CPE 720. HTTP post request including a TR-069 inform message encoded as SOAP 725 includes event 2 Periodic and the IMEI value identifying the CPE 720. The periodic inform interval defines a frequency of communication between the CPE 720 and the ACS 730.

ACS 730 then sends CPE 720 HTTP InformResponse 732, in response to the previous HTTP request of TR-069 inform message 725, which includes no arguments.

Figure 8:
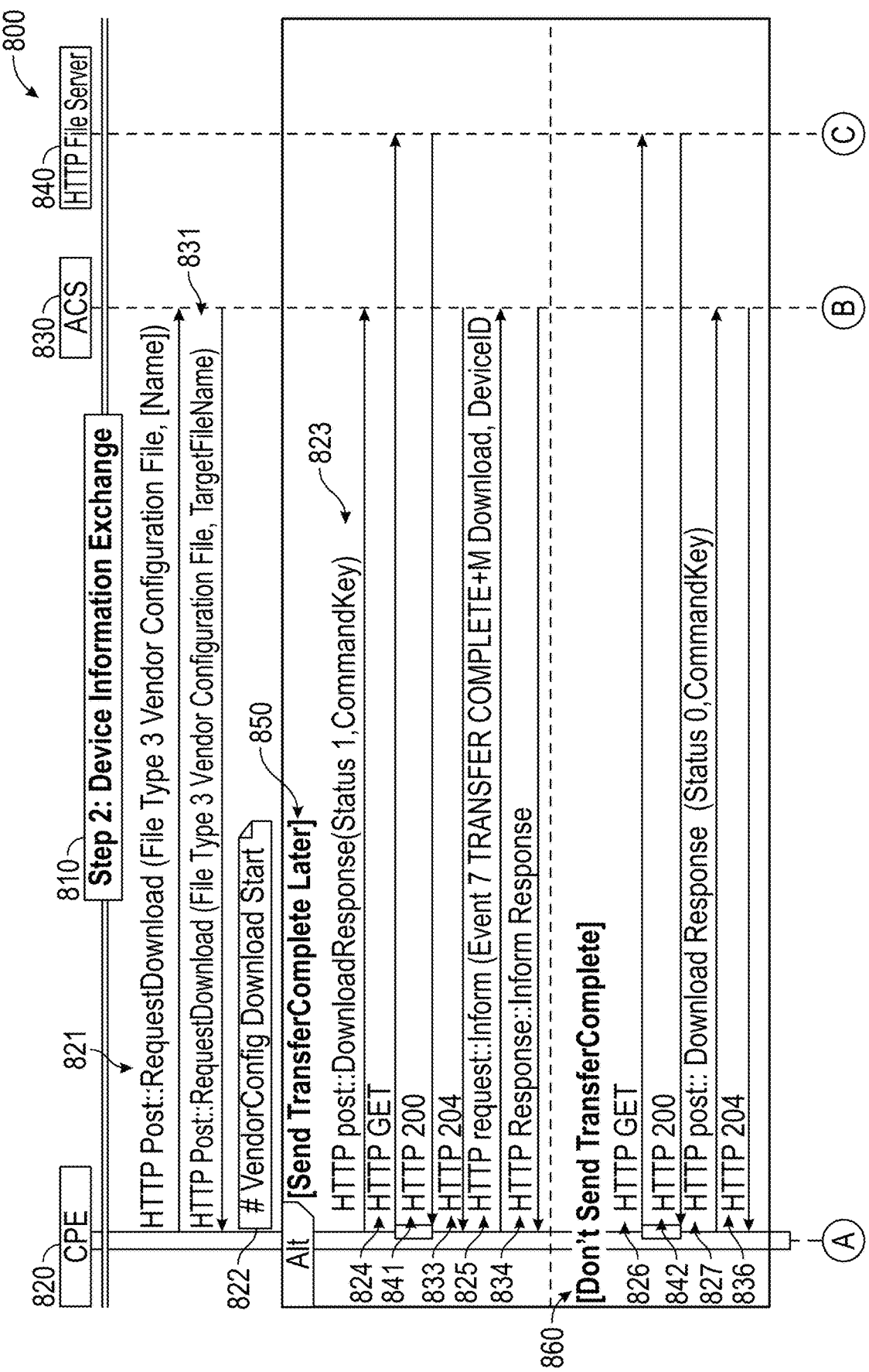
FIG. 8 illustrates the device information exchange method according to at least one embodiment.
Figure 8:
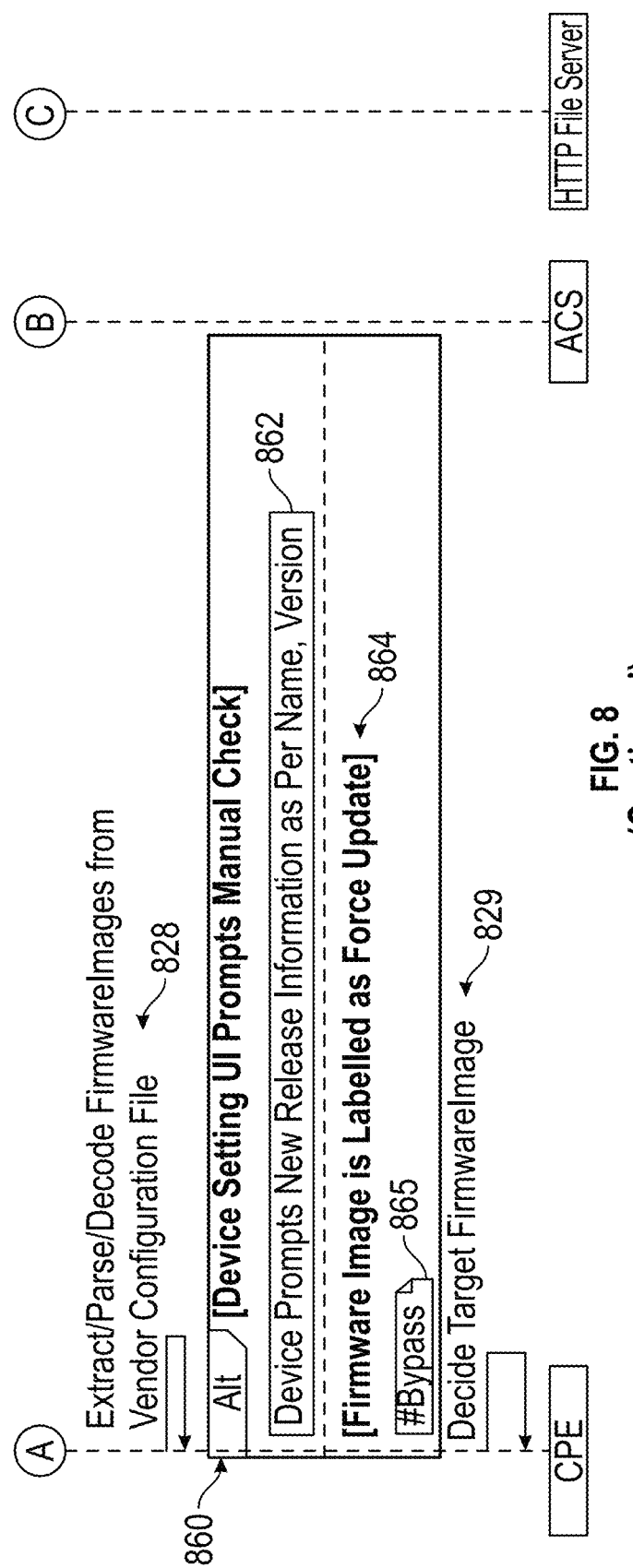

FIG. 8 illustrates the device information exchange method 800 according to at least one embodiment.

In FIG. 8, Device Information Exchange 810 begins with CPE 820 sending ACS 830 an HTTP post request including a TR-069 RequestDownload 821 including parameters FileType 3 Vendor Configuration File to download a vendor configuration file from HTTP File Server 840 under management of ACS 830. ACS 830 responds with HTTP response including a TR-069 Download 831 with parameters FileType 3 Vendor Configuration File, and TargetFileName to provide CPE 820 the name of the target vendor configuration file at HTTP File Server 840. The VendorConfigFile download then begins 822.

In at least one embodiment, CPE 820 informs ACS 830 after the download has completed 850. CPE 820 sends ACS 830 HTTP post request including a TR-069 DownloadResposne 823 with parameters of Status value 1 and CommandKey. Status value 1 lets the ACS 830 know that the Vendor Configuration File is to be downloaded, but has not yet completed. CPE 820 sends HTTP File Server 840 HTTP GET message 824 to obtain the Vendor Configuration File based on the target file name of the Vendor Configuration File identified by ACS 830. HTTP File Server 840 provides the Vendor Configuration File as an arbitrary binary data stream, e.g., octet-stream, within an HTTP 200 OK response 841. ACS 830 sends CPE 820 HTTP 204 "No Content" HTTP status code 833 to inform the CPE 820 that the HTTP File Server 840 has successfully fulfilled the request and that there is no further content to send to CPE 820. CPE 820 sends ACS 830 HTTP post request including TR-069 Inform 825 with parameters event 7 TRANSFER COMPLETE+ M Download and DeviceID. Events that start with "M" are associated with an RPC recently completed by the CPE 820. CPE 820 uses 7 TRANSFER COMPLETE+ M Download to indicate to ACS 830 that the download of the Vendor Configuration File has completed. The ACS 830 returns to CPE 820 an HTTP response including a TR-069 InformResponse 834 as an acknowledgement to CPE 820.

Alternatively, CPE 820 exchanges information with ACS 830 to setup of the download of the Vendor Configuration File without sending a transfer complete message 860. CPE 820 sends HTTP File Server 840 HTTP GET message 826 to obtain the Vendor Configuration File from the HTTP File Server 840 based on the target file name identified by ACS 830 in message 831. HTTP File Server 840 responds with an HTTP 200 OK response 842.

CPE 820 sends ACS 830 an HTTP post request including a TR-069 DownloadResponse 827 with parameters of Status value 0 and CommandKey. Status value 0 lets the ACS 830 know that Vendor Configuration File has been downloaded. ACS 830 sends CPE 820 HTTP 204 "No Content" HTTP status code 836 to inform the CPE 820 that the HTTP File Server 840 has successfully fulfilled the request and that there is no further content to send to CPE 820.

CPE 820 extracts, parses, decodes the firmware images from the Vendor Configuration File 828. Alternatively, a device setting UI prompts the CPE 820 to perform a manual check 860. CPE 820 prompts new release information using the name and version 862. In response to the firmware image being labeled as ForceUpdate 864, the process is bypassed 865. The CPE 820 then decides on the target firmware image to use 829.

Figure 9:
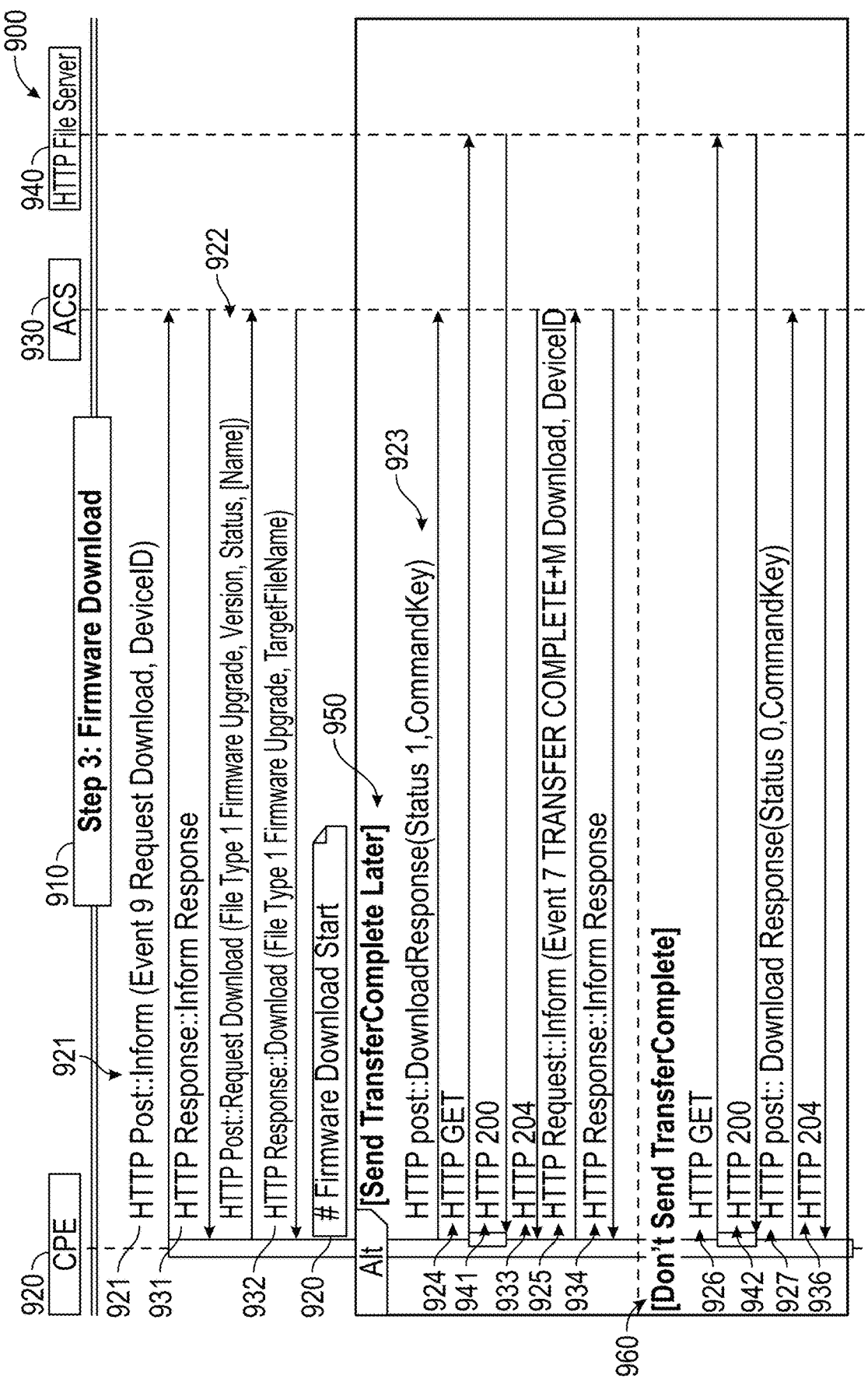
FIG. 9 illustrates a firmware download method according to at least one embodiment.

FIG. 9 illustrates a firmware download method 900 according to at least one embodiment.

In FIG. 9, firmware download 910 begins by the CPE 920 sending the ACS 930 HTTP post request including a TR-069 Inform 921 with parameters event 9 REQUEST DOWNLOAD and deviceID to inform ACS 930 that CPE 920 is ready to download the firmware image. ACS 930 returns HTTP response including a TR-069 InformResponse 931 to inform CPE 920 to begin downloading the firmware image. CPE 920 sends ACS 930 an HTTP post request including a TR-069 RequestDownload 922 with parameters of FileType 1 Firmware Upgrade and Version, Status. ACS 930 returns a TR-069 Download request 932 in an HTTP response including parameters of FileType 1 Firmware Upgrade and TargetFileName. Then, the firmware download begins 920.

In at least one embodiment, CPE 920 informs ACS 930 after the download has completed 950. CPE 920 sends ACS 930 HTTP post request including a TR-069 DownloadResponse 923 including parameters of Status value 1 and CommandKey. Status value 1 lets the ACS 930 know that the firmware image is to be downloaded, but has not yet completed. CPE 920 sends HTTP File Server 940 an HTTP GET message 924 to obtain the firmware image based on a target file name of the firmware image identified by ACS 930 in message 932. HTTP File Server 940 responds with HTTP 200 OK message 941. ACS 930 sends CPE 920 an HTTP 204 "No Content" HTTP status code 933 to inform the CPE 920 that the HTTP File Server 940 has successfully fulfilled the request and that there is no further content to send to CPE 920. CPE 920 sends ACS 930 an HTTP post request including a TR-069 Inform 925 with parameters of event 7 TRANSFER COMPLETE+ M Download and DeviceID to indicate to ACS 930 that the download of the firmware image has completed. The ACS 930 returns to CPE 920 an HTTP post response including a TR-069 InformResponse 934 as an acknowledgement to CPE 920.

Alternatively, CPE 920 exchanges information with ACS 930 to setup of the download of the firmware image without sending a transfer complete message 960. CPE 920 sends HTTP File Server 940 an HTTP GET message 926 to obtain the firmware image from the HTTP File Server 940 based on the target file name identified by ACS 930 in message 932. HTTP File Server 940 responds with HTTP 200 OK message 942. CPE 920 sends ACS 930 an HTTP post request including a TR-069 DownloadResponse 927 with parameters Status value 0 and CommandKey. Status value 0 lets the ACS 930 know that firmware image has been completed. ACS 930 sends CPE 920 an HTTP 204 "No Content" HTTP status code 935 to inform the CPE 920 that the HTTP File Server 940 has successfully fulfilled the request and that there is no further content to send to CPE 920.

FIG. 10 illustrates the firmware installation method 900 according to at least one embodiment.

In FIG. 10, Firmware Installation 1010 begins with CPE 1020 installing the firmware 1021.

FIG. 11 illustrates the device reboot method 1100 according to at least one embodiment.

In FIG. 11, Device Reboot 1110 begins with CPE 1120 performing a Reboot 1121. In response to successful application of the firmware image, CPE 1120 sends an HTTP post request including a TR-069 Inform 1122 with a parameter of event 1 Boot to ACS 1130 to inform ACS 1130 that the firmware image was successfully applied. ACS 1130 sends HTTP post response including a TR-069 InformResponse 1131 to CPE 1120 to acknowledge that the firmware image was successfully applied by CPE 1120.

At least one embodiment provides an over-the-air (OTA) platform for TR-069 devices to manage vendor-specific configuration and firmware. The OTA management of vendor-specific configuration and firmware for TR-069 devices includes establishing, by a server, a TR-069 session with a client device upon receiving a first request from the client device, receiving, by the server, a second request from the client device to download a vendor configuration file, sending, by the server, a first target file name identifying the vendor configuration file at an HTTP file server, receiving, by the server, a first notification that the vendor configuration file has been downloaded by the client device from the HTTP file server, receiving, by the server, a third request from the client device to download a firmware image identified by the vendor configuration file, sending, by the server, a second target file name identifying the firmware image at the HTTP file server, receiving, by the server, a second notification from the client device that the firmware image was downloaded from the HTTP file server and that the firmware image was successfully applied by the client device, and sending, by the server, a third notification to the client device acknowledging that the firmware image was successfully applied by the client device.

Figure 12:
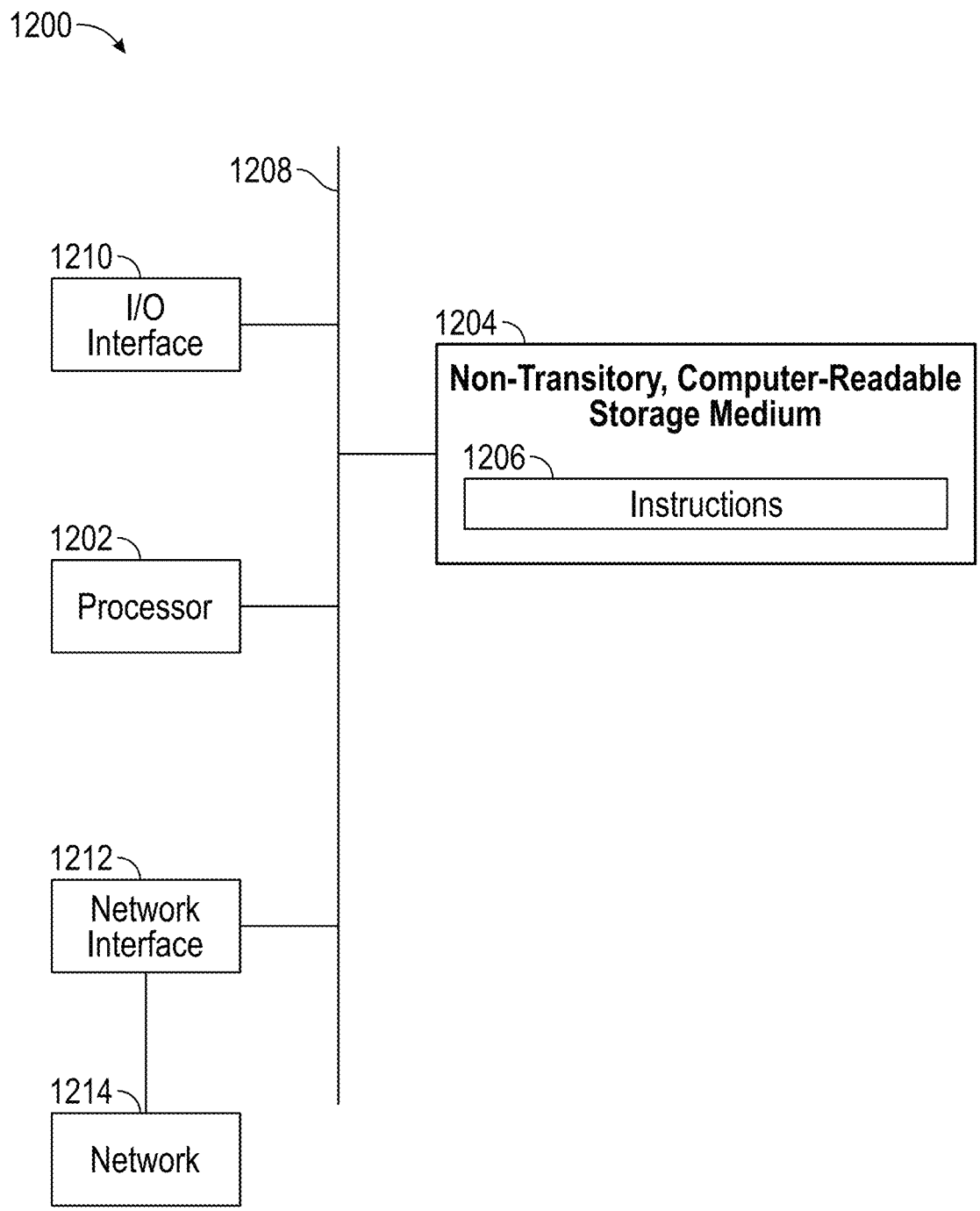
FIG. 12 is a high-level functional block diagram of a processor-based system according to at least one embodiment.

FIG. 12 is a high-level functional block diagram of a processor-based system 1200 according to at least one embodiment.

In at least one embodiment, Processing Circuitry 1200 provides a firmware over-the-air (FOTA) update to client devices. Processing Circuitry 1200 implements an over-the-air (OTA) platform for TR-069 devices to manage vendor-specific configuration and firmware using Processor 1202. Processing Circuitry 1200 also includes a non-transitory, Computer-Readable Storage Medium 1204 that is used to implement an over-the-air (OTA) platform for TR-069 devices to manage vendor-specific configuration and firmware for client devices. Storage Medium 1204, amongst other things, is encoded with, i.e., stores, Instructions 1206, i.e., computer program code that are executed by Processor 1202 performs operations for providing a an over-the-air (OTA) platform for TR-069 devices to manage vendor-specific configuration and firmware. Execution of Instructions 1206 by Processor 1202 implements at least a portion of the methods described herein in accordance with one or more embodiments (hereinafter, the noted processes and/or methods).

Processor 1202 is electrically coupled to Computer-Readable Storage Medium 1204 via a Bus 1208. Processor 1202 is electrically coupled to an Input/output (I/O) Interface 1210 by Bus 1208. A Network Interface 1212 is also electrically connected to Processor 1202 via Bus 1208. Network Interface 1212 is connected to a Network 1214, so that Processor 1202 and Computer-Readable Storage Medium 1204 connect to external elements via Network 1214. Processor 1202 is configured to execute Instructions 1206 encoded in Computer-Readable Storage Medium 1204 to cause Processing Circuitry 1200 to be usable for performing at least a portion of the processes and/or methods. In one or more embodiments, Processor 1202 is a Central Processing Unit (CPU), a multi-processor, a distributed processing system, an Application Specific Integrated Circuit (ASIC), and/or a suitable processing unit.

Processing Circuitry 1200 includes I/O Interface 1210. I/O Interface 1210 is coupled to external circuitry. In one or more embodiments, I/O Interface 1210 includes a keyboard, keypad, mouse, trackball, trackpad, touchscreen, and/or cursor direction keys for communicating information and commands to Processor 1202.

Processing Circuitry 1200 also includes Network Interface 1212 coupled to Processor 1202. Network Interface 1212 allows Processing Circuitry 1200 to communicate with Network 1214, to which one or more other computer systems are connected. Network Interface 1212 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 1264.

Processing Circuitry 1200 is configured to receive information through I/O Interface 1210. The information received through I/O Interface 1210 includes one or more of instructions, data, design rules, libraries of cells, and/or other parameters for processing by Processor 1202. The information is transferred to Processor 1202 via Bus 1208. Processing Circuitry 1200 is configured to receive information from Storage Medium 1204 through I/O Interface 1210.

In one or more embodiments, one or more Non-Transitory Computer-Readable Storage Medium 1204 having stored thereon instructions (in compressed or uncompressed form) that are used to program a computer, processor, or other electronic device) to perform processes or methods described herein. The one or more Non-Transitory Computer-Readable Storage Medium 1204 include one or more of an electronic storage medium, a magnetic storage medium, an optical storage medium, a quantum storage medium, or the like. For example, the computer-readable storage media includes, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Medium 1204 includes a Compact Disk-Read Only Memory (CD-ROM), a Compact Disk-Read/Write (CD-R/W), and/or a Digital Video Disc (DVD).

In one or more embodiments, Storage Medium 1204 stores Instructions 1206 configured to cause Processing Circuitry 1200 to perform at least a portion of the processes and/or methods for providing an over-the-air (OTA) platform for TR-069 devices to manage vendor-specific configuration and firmware. In one or more embodiments, Storage Medium 1204 also stores information, such as algorithm which facilitates performing at least a portion of the processes and/or methods for providing an over-the-air (OTA) platform for TR-069 devices to manage vendor-specific configuration and firmware. Accordingly, in at least one embodiment, the processor circuitry 1200 performs a method for providing an over-the-air (OTA) platform for TR-069 devices to manage vendor-specific configuration and firmware. The process providing an over-the-air (OTA) platform for TR-069 devices to manage vendor-specific configuration and firmware includes establishing, by a server, a TR-069 session with a client device upon receiving a first request from the client device, receiving, by the server, a second request from the client device to download a vendor configuration file, sending, by the server, a first target file name identifying the vendor configuration file at an HTTP file server, receiving, by the server, a first notification that the vendor configuration file has been downloaded by the client device from the HTTP file server, receiving, by the server, a third request from the client device to download a firmware image identified by the vendor configuration file, sending, by the server, a second target file name identifying the firmware image at the HTTP file server, receiving, by the server, a second notification from the client device that the firmware image was downloaded from the HTTP file server and that the firmware image was successfully applied by the client device, and sending, by the server, a third notification to the client device acknowledging that the firmware image was successfully applied by the client device.

The process for providing an over-the-air (OTA) platform for TR-069 devices to manage vendor-specific configuration and firmware provides the advantage of simplification of OTA server deployment. Because configurations are encapsulated into vendor's configuration files, devices do not rely on individual servers of network operators and providers. Vendors are able to maintain confidential configuration files while still using the OTA service platform of the carrier.

Separate instances of these programs are executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above are utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method of providing Over-The-Air (OTA) management of vendor-specific configuration and firmware for TR-069 devices, comprising:

establishing, by a server, a TR-069 session with a client device upon receiving a first request from the client device;

receiving, by the server, a second request from the client device to download a vendor configuration file;

sending, by the server, a first target file name identifying the vendor configuration file at an HTTP file server;

receiving, by the server, a first notification that the vendor configuration file has been downloaded by the client device from the HTTP file server;

receiving, by the server, a third request from the client device to download a firmware image identified by the vendor configuration file;

sending, by the server, a second target file name identifying the firmware image at the HTTP file server;

receiving, by the server, a second notification from the client device that the firmware image was downloaded from the HTTP file server and that the firmware image was successfully applied by the client device; and sending, by the server, a third notification to the client device acknowledging that the firmware image was successfully applied by the client device.

2. The method of claim 1, wherein the establishing, by the server, the TR-069 session with the client device upon receiving the first request from the client device includes receiving the first request from a device setting UI of the client device or receiving the first request based on an autonomous poll of the client device.

3. The method of claim 1, wherein the receiving, by the server, the first notification that the vendor configuration file has been downloaded by the client device from the HTTP file server further includes receiving a transfer complete message from the client device indicating that the download of the vendor configuration file has successfully been downloaded by the client device.

4. The method of claim 1, wherein the receiving, by the server, the second notification from the client device that the firmware image was downloaded from the HTTP file server further includes receiving a transfer complete message from the client device indicating that the download of the firmware image has successfully been downloaded by the client device.

5. The method of claim 1, wherein the client device is a TR-069 client device, and wherein the establishing, by the server, the TR-069 session with the client device upon receiving the first request from the client device further includes running network functions to serve the TR-069 client device in a serverless computing environment.

6. The method of claim 1 further comprising receiving, at the server, data model parameters of the client device using a TR-069 protocol including TR-181 data model parameters of the client device.

7. The method of claim 6, wherein the receiving, at the server, TR-181 data model parameters includes receiving at least:

an International Mobile Equipment Identity (IMEI) number associated with the client device;

an identification of a version of the firmware associated with the client device; and an identification of the version of the configuration file used by the client device, and the date and time of application of the vendor configuration file by the client device.

8. A platform for providing Over-The-Air (OTA) management of vendor-specific configuration and firmware for TR-069 devices, comprising:

a memory storing computer-readable instructions; and a processor configured to execute the computer-readable instructions to:
- establish a TR-069 session with a client device upon receiving a first request from the client device;
- receive a second request from the client device to download a vendor configuration file;
- send a first target file name identifying the vendor configuration file at an HTTP file server;
- receive a first notification that the vendor configuration file has been downloaded by the client device from the HTTP file server;
- receive a third request from the client device to download a firmware image identified by the vendor configuration file;
- send a second target file name identifying the firmware image at the HTTP file server;
- receive a second notification from the client device that the firmware image was downloaded from the HTTP file server and that the firmware image was successfully applied by the client device; and
- send a third notification to the client device acknowledging that the firmware image was successfully applied by the client device.

9. The platform of claim 8, wherein the processor established the TR-069 session with the client device upon receiving the first request from the client device by receiving the first request from a device setting UI of the client device or receiving the first request based on an autonomous poll of the client device.

10. The platform of claim 8, wherein the processor receives the first notification that the vendor configuration file has been downloaded by the client device from the HTTP file server further by receiving a transfer complete message from the client device indicating that the download of the vendor configuration file has successfully been downloaded by the client device.

11. The platform of claim 8, wherein the processor is further configured to receive a transfer complete message from the client device indicating that the download of the firmware image has successfully been downloaded by the client device.

12. The platform of claim 8, wherein the client device is a TR-069 client device, and wherein the processor establishes the TR-069 session with the client device upon receiving the first request from the client device by running network functions to serve the TR-069 client device in a serverless computing environment.

13. The platform of claim 8, wherein the processor is further configured to receive data model parameters of the client device using a TR-069 protocol including TR-181 data model parameters of the client device.

14. The platform of claim 13, wherein the processor receives the TR-181 data model parameters by receiving at least:
- an International Mobile Equipment Identity (IMEI) number associated with the client device;
- an identification of a version of the firmware associated with the client device; and
- an identification of the version of the configuration file used by the client device, and the date and time of application of the vendor configuration file by the client device.

15. A non-transitory computer-readable media having computer-readable instructions stored thereon, which when executed by a processor causes the processor to perform operations comprising:
- establishing, by a server, a TR-069 session with a client device upon receiving a first request from the client device;
- receiving, by the server, a second request from the client device to download a vendor configuration file;
- sending, by the server, a first target file name identifying the vendor configuration file at an HTTP file server;
- receiving, by the server, a first notification that the vendor configuration file has been downloaded by the client device from the HTTP file server;
- receiving, by the server, a third request from the client device to download a firmware image identified by the vendor configuration file;
- sending, by the server, a second target file name identifying the firmware image at the HTTP file server;
- receiving, by the server, a second notification from the client device that the firmware image was downloaded from the HTTP file server and that the firmware image was successfully applied by the client device; and
- sending, by the server, a third notification to the client device acknowledging that the firmware image was successfully applied by the client device.

16. The non-transitory computer-readable media of claim 15, wherein the establishing, by the server, the TR-069 session with the client device upon receiving the first request from the client device includes receiving the first request from a device setting UI of the client device or receiving the first request based on an autonomous poll of the client device.

17. The non-transitory computer-readable media of claim 15, wherein the receiving, by the server, the first notification that the vendor configuration file has been downloaded by the client device from the HTTP file server further includes receiving a transfer complete message from the client device indicating that the download of the vendor configuration file has successfully been downloaded by the client device.

18. The non-transitory computer-readable media of claim 15, wherein the receiving, by the server, the second notification from the client device that the firmware image was downloaded from the HTTP file server further includes receiving a transfer complete message from the client device indicating that the download of the firmware image has successfully been downloaded by the client device.

19. The non-transitory computer-readable media of claim 15, wherein the client device is a TR-069 client device, and wherein the establishing, by the server, the TR-069 session with the client device upon receiving the first request from the client device further includes running network functions to serve the TR-069 client device in a serverless computing environment.

20. The non-transitory computer-readable media of claim 15 further comprising receiving, at the server, data model parameters of the client device using a TR-069 protocol including TR-181 data model parameters of the client device, wherein the receiving, at the server, TR-181 data model parameters includes receiving at least:
- an International Mobile Equipment Identity (IMEI) number associated with the client device;
- an identification of a version of the firmware associated with the client device; and
- an identification of the version of the configuration file used by the client device, and the date and time of application of the vendor configuration file by the client device.

* * * * *